(12) United States Patent
Qian et al.

(10) Patent No.: US 8,979,402 B2
(45) Date of Patent: *Mar. 17, 2015

(54) FRICTION MEMBER FOR BRAKE MECHANISM AND CAMERA SHUTTER USING THE SAME

(75) Inventors: Li Qian, Beijing (CN); Yu-Quan Wang, Beijing (CN); Chen Feng, Beijing (CN); Liang Liu, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 189 days.

This patent is subject to a terminal disclaimer.

(21) Appl. No.: 13/220,782

(22) Filed: Aug. 30, 2011

(65) Prior Publication Data

US 2012/0141109 A1    Jun. 7, 2012

(30) Foreign Application Priority Data

Dec. 7, 2010    (CN) .......................... 2010 1 0576901

(51) Int. Cl.
*G03B 9/10*    (2006.01)
*G03B 9/08*    (2006.01)
*B82Y 30/00*    (2011.01)
*G03B 9/22*    (2006.01)
*G03B 9/20*    (2006.01)

(52) U.S. Cl.
CPC . *G03B 9/08* (2013.01); *B82Y 30/00* (2013.01); *G03B 9/22* (2013.01); *G03B 9/10* (2013.01); *G03B 9/20* (2013.01)
USPC ............................ 396/453; 396/452; 396/454

(58) Field of Classification Search
CPC .................................. G03B 9/08; G03B 9/10
USPC ................. 396/452–454; 524/495; 428/315.5
See application file for complete search history.

(56) References Cited

U.S. PATENT DOCUMENTS

| 5,543,880 | A  | * | 8/1996  | Matsubara et al. | ........... 396/452 |
| 7,727,624 | B2 | * | 6/2010  | Cao et al. | .................... 428/315.5 |
| 7,772,317 | B2 | * | 8/2010  | Kaya et al. | ..................... 524/495 |
| 7,854,991 | B2 | * | 12/2010 | Hata et al. | ...................... 428/408 |

(Continued)

FOREIGN PATENT DOCUMENTS

| CN | 1386792 |   * | 12/2002 | ............... C08K 3/02 |
| CN | 1386792 | A   | 12/2002 | |

(Continued)

*Primary Examiner* — Clayton E Laballe
*Assistant Examiner* — Kevin Butler
(74) *Attorney, Agent, or Firm* — Novak Druce Connolly Bove + Quigg LLP

(57) ABSTRACT

A friction member for a brake mechanism in a camera shutter is provided. The friction member includes at least two carbon nanotube composite layers stacked on each other, each carbon nanotube composite layer includes a polymer and a carbon nanotube structure including a number of carbon nanotubes substantially oriented along a same direction. An angle defined by the carbon nanotubes oriented along the same direction in adjacent carbon nanotube composite layers ranges from greater than 0 degrees, and less than or equal to 90 degrees. The camera shutter using the friction member is also provided. The camera shutter includes a brake mechanism and a drive mechanism including a blade driving lever having a moving path. The brake mechanism includes two abovementioned friction members and a brake lever clamped between the two friction members. The brake lever is located at a termination of the moving path to brake the blade driving lever.

20 Claims, 11 Drawing Sheets

(56) References Cited

U.S. PATENT DOCUMENTS

| | | | |
|---|---|---|---|
| 8,114,518 B2 * | 2/2012 | Hata et al. | 428/408 |
| 8,211,267 B2 * | 7/2012 | Lin et al. | 156/296 |
| 8,318,308 B2 * | 11/2012 | Hata et al. | 428/408 |
| 2007/0213419 A1 * | 9/2007 | Cao et al. | 521/98 |
| 2008/0213555 A1 * | 9/2008 | Ono et al. | 428/215 |
| 2008/0318049 A1 * | 12/2008 | Hata et al. | 428/408 |
| 2009/0118420 A1 * | 5/2009 | Zou et al. | 524/577 |
| 2010/0112828 A1 * | 5/2010 | Eldridge et al. | 439/66 |
| 2010/0213189 A1 * | 8/2010 | Keite-Telgenbuescher et al. | 219/548 |
| 2010/0285300 A1 | 11/2010 | Wang et al. | |
| 2011/0318568 A1 * | 12/2011 | Liu et al. | 428/315.5 |
| 2012/0137588 A1 * | 6/2012 | Qian et al. | 49/89.1 |
| 2012/0141108 A1 * | 6/2012 | Qian et al. | 396/453 |
| 2012/0141109 A1 * | 6/2012 | Qian et al. | 396/453 |
| 2012/0141111 A1 * | 6/2012 | Qian et al. | 396/497 |
| 2012/0141112 A1 * | 6/2012 | Qian et al. | 396/497 |
| 2012/0289112 A1 * | 11/2012 | Mao et al. | 442/72 |

FOREIGN PATENT DOCUMENTS

| | | | |
|---|---|---|---|
| CN | 101191843 | 6/2008 | |
| CN | 101409999 | 4/2009 | |
| CN | 101857710 | 10/2010 | |
| JP | 2003-238820 | * 8/2003 | G03B 9/10 |

* cited by examiner

FRICTION MEMBER FOR BRAKE MECHANISM AND CAMERA SHUTTER USING THE SAME

RELATED APPLICATIONS

This application claims all benefits accruing under 35 U.S.C. §119 from China Patent Application No. 201010576901.7, filed on Dec. 7, 2010 in the China Intellectual Property Office, the disclosure of which is incorporated herein by reference.

BACKGROUND

1. Technical Field

The present disclosure relates to friction members and camera shutters and, in particular, to a friction member used for a brake mechanism and a camera shutter using the same.

2. Discussion of Related Art

In order to obtain a camera shutter with high shutter speed and high durability, it is important to make shutter blades light and to improve the brake performance of a brake mechanism of the shutter.

The braking force of the brake mechanism varies according to the thickness of friction members such as washers, and a set of friction members having proper thickness to calibrate the braking force. Polyethylene terephthalate (PET) is often used as a material of the friction members. However, the friction members made of PET can be damaged by the blade in the braking process with an acceleration of the shutter speed. Thus, the initial braking performance cannot be maintained, and the shutter blade can be damaged in an early stage, or the durability of the shutter may be extremely decreased.

What is needed, therefore, is to provide a friction member for brake mechanism and a camera shutter using the same that can overcome the above-described shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

A friction member is to provide a stable friction force for a brake lever in the brake mechanism in a camera shutter, thereby braking the brake lever. Therefore, the friction member should have high mechanical strength and wearability. The friction member can be any of number of desired shapes according to demands of space and any other requirements. The friction member can be a washer with a ring-shaped sheet structure. A thickness of the washer can be in a range from about 50 micrometers (μm) to about 500 μm. In one embodiment, the thickness of the washer can be in a range from about 50 μm to about 100 μm. The washer defines an inner diameter and an outer diameter, and the inner diameter and the outer diameter of the washer can be selected as desired.

The friction member includes a carbon nanotube polymer composite. The carbon nanotube polymer composite includes a carbon nanotube structure and a polymer. The carbon nanotube structure is about 5% to 80% by weight of the friction member. In one embodiment, the carbon nanotube structure is about 10% to 30% by weight of the friction member.

The polymer can be thermoset or thermoplastic, such as epoxy resin, polyolefin, acrylic resin, polyamide (PA), polyurethane (PU), polycarbonate (PC), polyoxymethylene resin (POM), polyethylene terephthalate (PET), polymethyl methacrylate acrylic (PMMA), or silicone.

The carbon nanotube structure can be a free-standing structure including a plurality of carbon nanotubes. Adjacent carbon nanotubes tightly combine with each other and define a plurality of micropores. The carbon nanotube structure is located within the polymer. The polymer covers surfaces of the carbon nanotube structure and fills into the micropores.

The carbon nanotube structure can include at least one carbon nanotube film comprising a plurality of carbon nanotubes. If the thickness of the carbon nanotube film is thick enough, the carbon nanotube structure in the friction member can be a single carbon nanotube film. If the thickness of the carbon nanotube film is relatively thin, the carbon nanotube structure can include a plurality of carbon nanotube films stacked on each other, and the adjacent carbon nanotube films closely combine with each other. The carbon nanotubes in each of the carbon nanotube film are substantially parallel to a surface of the carbon nanotube film along the carbon nanotubes extending directions.

Figure 1:
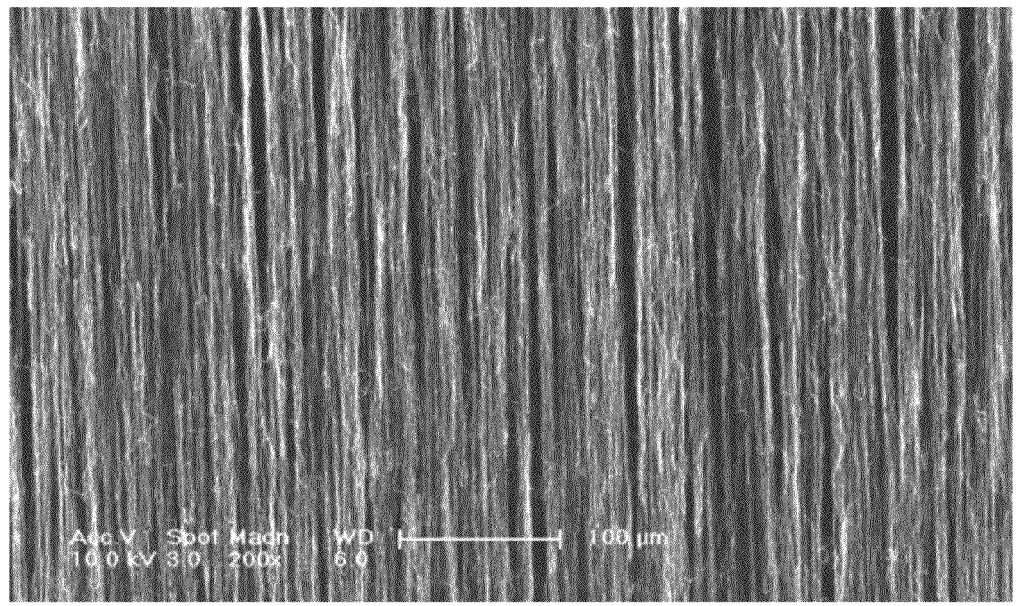
FIG. 1 shows a scanning electron microscope (SEM) image of a drawn carbon nanotube film.

Referring to FIG. 1, the carbon nanotube film can be a drawn carbon nanotube film formed by drawing a film from a carbon nanotube array. Examples of the drawn carbon nanotube film are taught by U.S. Pat. No. 7,045,108 to Jiang et al. The thickness of the drawn carbon nanotube film can be in a range from about 0.5 nanometers (nm) to about 100 μm.

The drawn carbon nanotube film includes a plurality of carbon nanotubes that are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction by van der Waals attractive force. A small number of the carbon nanotubes are randomly arranged in the drawn carbon nanotube film, and has a small if not negligible effect on the larger number of the carbon nanotubes in the drawn carbon nanotube film arranged substantially along the same direction. It can be appreciated that some variation can occur in the orientation of the carbon nanotubes in the drawn carbon nanotube film. Microscopically, the carbon nanotubes oriented substantially along the same direction may not be perfectly aligned in a straight line, and some curve portions may exist. It can be understood that contact between some carbon nanotubes located substantially side by side and oriented along the same direction cannot be totally excluded.

More specifically, the drawn carbon nanotube film can include a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity, and shape. The carbon nanotubes in the drawn carbon nanotube film are also substantially oriented along a preferred orientation. The width of the drawn carbon nanotube film relates to the carbon nanotube array from which the drawn carbon nanotube film is drawn.

The carbon nanotube structure can include a plurality of drawn carbon nanotube film. An angle can exist between the orientation of the carbon nanotubes in adjacent films, stacked, and/or coplanar. Adjacent carbon nanotube films can be combined by only the van der Waals attractive force therebetween without the need of an additional adhesive. An angle between the aligned directions of the carbon nanotubes in two adjacent drawn carbon nanotube films can range from about 0 degrees to about 90 degrees. Micropores are defined between two adjacent carbon nanotubes in the drawn carbon nanotube film. If the angle between the aligned directions of the carbon nanotubes in adjacent drawn carbon nanotube films is greater than 0 degrees, the micropores can be defined by the crossed carbon nanotubes in adjacent drawn carbon nanotube films.

Figure 2:
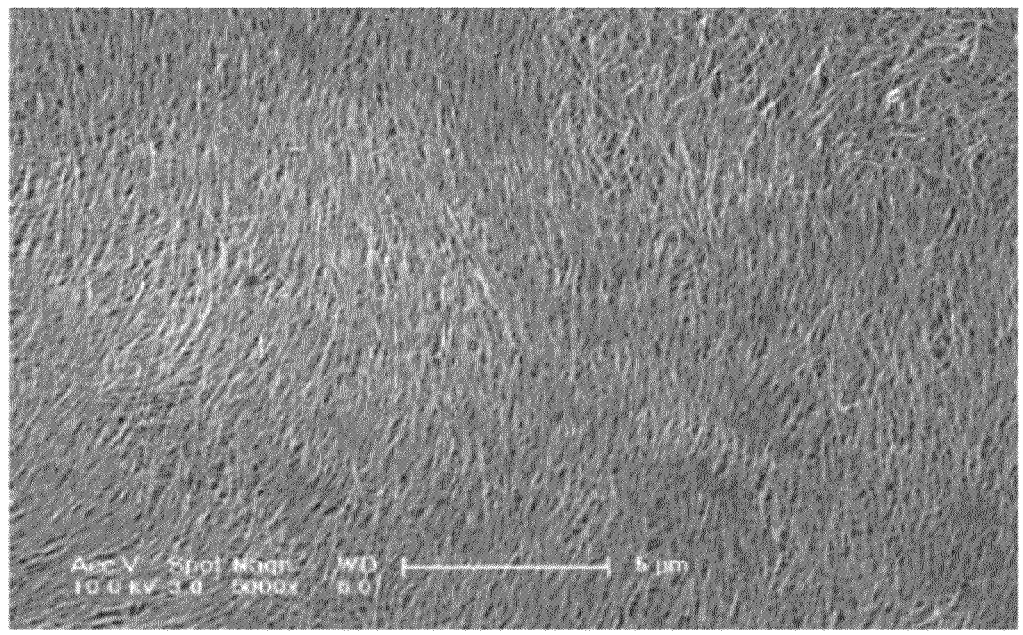
FIG. 2 shows an SEM image of a pressed carbon nanotube film.

Referring to FIG. 2, the carbon nanotube film can also be a pressed carbon nanotube film formed by pressing a carbon nanotube array down on the substrate. The carbon nanotubes in the pressed carbon nanotube array are arranged along a same direction or along different directions. The carbon nanotubes in the pressed carbon nanotube array can rest upon each other. Adjacent carbon nanotubes are attracted to each other and combined by van der Waals attractive force. An angle between a primary alignment direction of the carbon nanotubes and a surface of the pressed carbon nanotube array is about 0 degrees to approximately 15 degrees. The greater the pressure applied, the smaller the angle obtained. If the carbon nanotubes in the pressed carbon nanotube array are arranged along different directions, the carbon nanotube structure can be isotropic. Here, "isotropic" means the carbon nanotube film has properties identical in all directions substantially parallel to a surface of the carbon nanotube film. The thickness of the pressed carbon nanotube array can range from about 0.5 nm to about 1 mm. The length of the carbon nanotubes can be longer than 50 μm. Clearances can exist in the carbon nanotube array. Therefore, micropores can exist in the pressed carbon nanotube array and be defined by the adjacent carbon nanotubes. Examples of the pressed carbon nanotube film are taught by US PGPub. 20080299031A1 to Liu et al.

When the carbon nanotube structure includes a plurality of pressed carbon nanotube films including the carbon nanotubes substantially arranged along a same direction, an angle between the aligned directions of the carbon nanotubes in two adjacent pressed carbon nanotube films can range from about 0 degrees to about 90 degrees.

Figure 3:
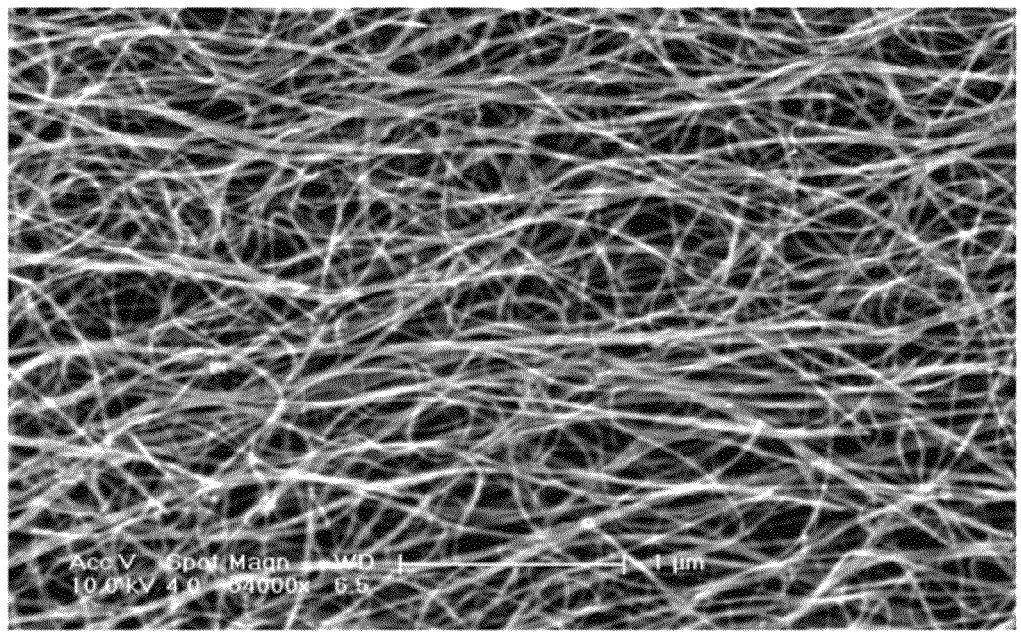
FIG. 3 shows an SEM image of a flocculated carbon nanotube film.

Referring to FIG. 3, the carbon nanotube film can be a flocculated carbon nanotube film formed by a flocculating method. The flocculated carbon nanotube film can include a plurality of long, curved, disordered carbon nanotubes entangled with each other. A length of the carbon nanotubes can be greater than 10 centimeters. In one embodiment, the length of the carbon nanotubes is in a range from about 200 μm to about 900 μm. Furthermore, the flocculated carbon nanotube film can be isotropic. The carbon nanotubes can be substantially uniformly distributed in the carbon nanotube film. The adjacent carbon nanotubes are acted upon by the van der Waals attractive force therebetween, thereby forming an entangled structure with micropores defined therein. The thickness of the flocculated carbon nanotube film can range from about 1 μm to about 1 millimeter (mm). In one embodiment, the thickness of the flocculated carbon nanotube film is about 100 μm.

The carbon nanotube structure can also include a plurality of stacked carbon nanotube layers. Each of the carbon nanotube layers includes a plurality of pure carbon nanotube wires substantially parallel to each other. Adjacent carbon nanotube wires define a plurality of interspaces. The polymer in the friction member also fills the interspaces. Each carbon nanotube wire includes a plurality of carbon nanotubes. Adjacent carbon nanotube layers are closely combined with each other by van der Waals attractive force. An angle between the carbon nanotube wires in at least two carbon nanotube layers can range from about 0 degrees to about 90 degrees. In one embodiment, an angle defined by the carbon nanotube wires in adjacent two carbon nanotube layers ranges from 0 degrees to about 90 degrees. The carbon nanotube wires in each carbon nanotube layer can be close arranged side by side or separated from each other with a determined distance.

Figure 4:
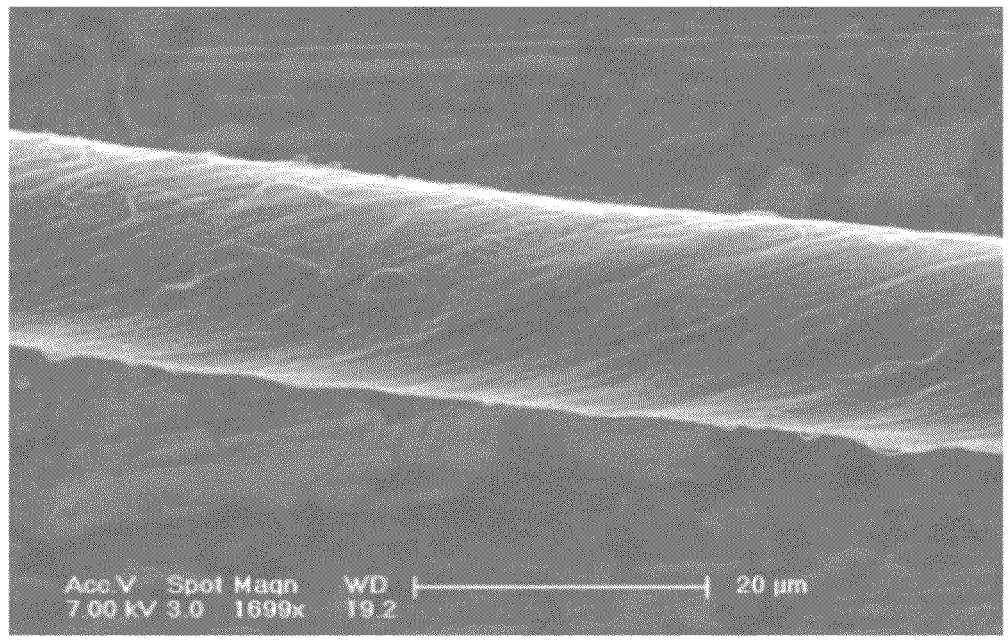
FIG. 4 shows an SEM image of an untwisted carbon nanotube wire.

The carbon nanotube wire can be untwisted or twisted. Referring to FIG. 4, treating the drawn carbon nanotube film with a volatile organic solvent can obtain the untwisted carbon nanotube wire. In one embodiment, the organic solvent is applied to soak the entire surface of the drawn carbon nanotube film. During the soaking, adjacent substantially parallel carbon nanotubes in the drawn carbon nanotube film will bundle together, due to the surface tension of the organic solvent as it volatilizes. Thus the drawn carbon nanotube film will be shrunken into an untwisted carbon nanotube wire. The untwisted carbon nanotube wire includes a plurality of carbon nanotubes substantially oriented along a same direction (i.e., a direction along the length direction of the untwisted carbon nanotube wire). The carbon nanotubes are substantially parallel to the axis of the untwisted carbon nanotube wire. In one embodiment, the untwisted carbon nanotube wire includes a plurality of successive carbon nanotubes joined end to end by van der Waals attractive force therebetween. The length of the untwisted carbon nanotube wire can be arbitrarily set as desired. A diameter of the untwisted carbon nanotube wire ranges from about 0.5 nm to about 100 μm. Examples of the untwisted carbon nanotube wire are taught by US Patent Application Publication US 2007/0166223 to Jiang et al.

Figure 5:
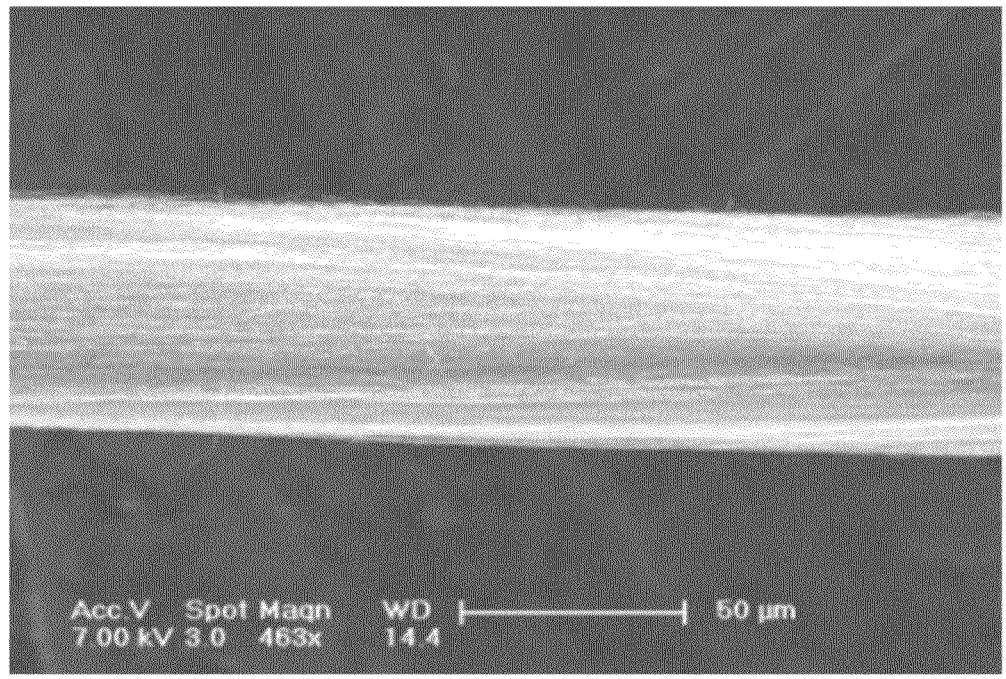
FIG. 5 shows an SEM image of a twisted carbon nanotube wire.

Referring to FIG. 5, the twisted carbon nanotube wire can be obtained by twisting a drawn carbon nanotube film using a mechanical force to turn the two ends of the drawn carbon nanotube film in opposite directions. The twisted carbon nanotube wire includes a plurality of carbon nanotubes helically oriented around an axial direction of the twisted carbon nanotube wire. In one embodiment, the twisted carbon nanotube wire includes a plurality of successive carbon nanotubes joined end to end by van der Waals attractive force therebetween. The length of the carbon nanotube wire can be set as desired. A diameter of the twisted carbon nanotube wire can be from about 0.5 nm to about 100 μm.

The twisted carbon nanotube wire can be treated with a volatile organic solvent, before or after being twisted. After being soaked by the organic solvent, the adjacent substantially parallel carbon nanotubes in the twisted carbon nanotube wire will bundle together, due to the surface tension of the organic solvent when the organic solvent volatilizes. The specific surface area of the twisted carbon nanotube wire will decrease, and the density and strength of the twisted carbon nanotube wire will be increased.

Figure 6:
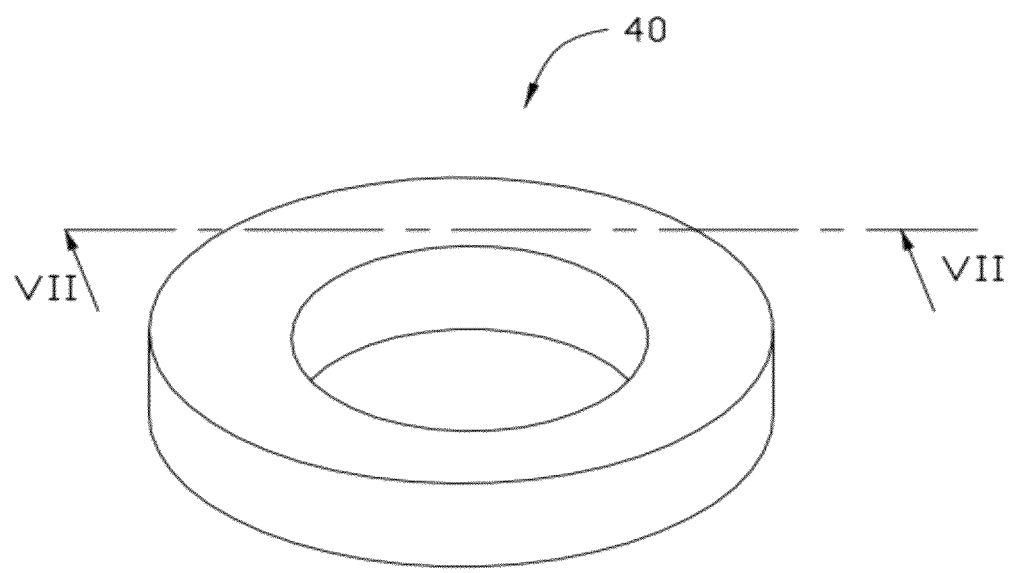
FIG. 6 is a schematic view of one embodiment of a friction member for brake mechanism in a camera shutter.
Figure 7:
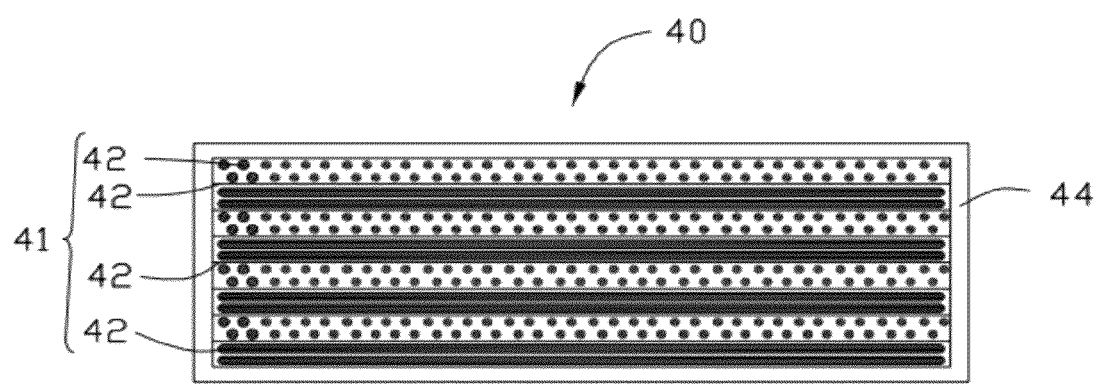
FIG. 7 is a cross-sectional view along a broken line VII-VII of the friction member in FIG. 6.

Referring to FIG. 6 and FIG. 7, one embodiment of a friction member 40 for a brake mechanism in a camera shutter is provided. The friction member 40 is a washer 40. The washer 40 is ring-shaped and defines an inner surface and an outer surface. In one embodiment according to FIG. 6, the washer 40 defines an inner diameter and an outer diameter. The washer 40 is a carbon nanotube polymer composite including a pure carbon nanotube structure 41 and a PET 44. The pure carbon nanotube structure 41 includes a plurality of stacked drawn carbon nanotube films 42, and the angles between the aligned directions of the carbon nanotubes in adjacent drawn carbon nanotube films 42 can be about 90 degrees. The drawn carbon nanotube film 42 defines a plurality of micropores. The PET 44 is coated on surfaces of the carbon nanotube structure 41 and filled into the micropores. The thickness of the washer 40 is about 50 μm. The carbon nanotube films 42 are about 20% by weight of the washer 40.

The washer 40 is made of the carbon nanotubes and PET. The carbon nanotubes have good mechanical properties. The tensile strength of the carbon nanotubes is about 100 times greater than the tensile strength of steel, and the elastic modulus of the carbon nanotubes is substantially equal to that of diamond. Therefore, the washer 40 is wearable and durable. The angles defined by the carbon nanotubes in adjacent drawn carbon nanotube films 42 are about 90 degrees, therefore, the washer 40 is prevented from cracking along the aligned directions of the carbon nanotubes, and is strong along any direction.

A method for making the washer 40 includes steps of:
providing the plurality of drawn carbon nanotube films 42;
forming the carbon nanotube structure 41 by stacking on the drawn carbon nanotube films 42, and angles defined by axial extending directions of the carbon nanotubes in each two adjacent drawn carbon nanotube films 42 being about 90 degrees;
applying PET to the carbon nanotube structure 41 to form a carbon nanotube PET composite; this may be done by dipping the carbon nanotube structure 41 into a liquid PET or coating the liquid PET on the carbon nanotube structure 41; and
stamping the carbon nanotube PET composite to form the washer 40. In one embodiment, the liquid PET can be a PET solution or a melted PET.

Figure 8:
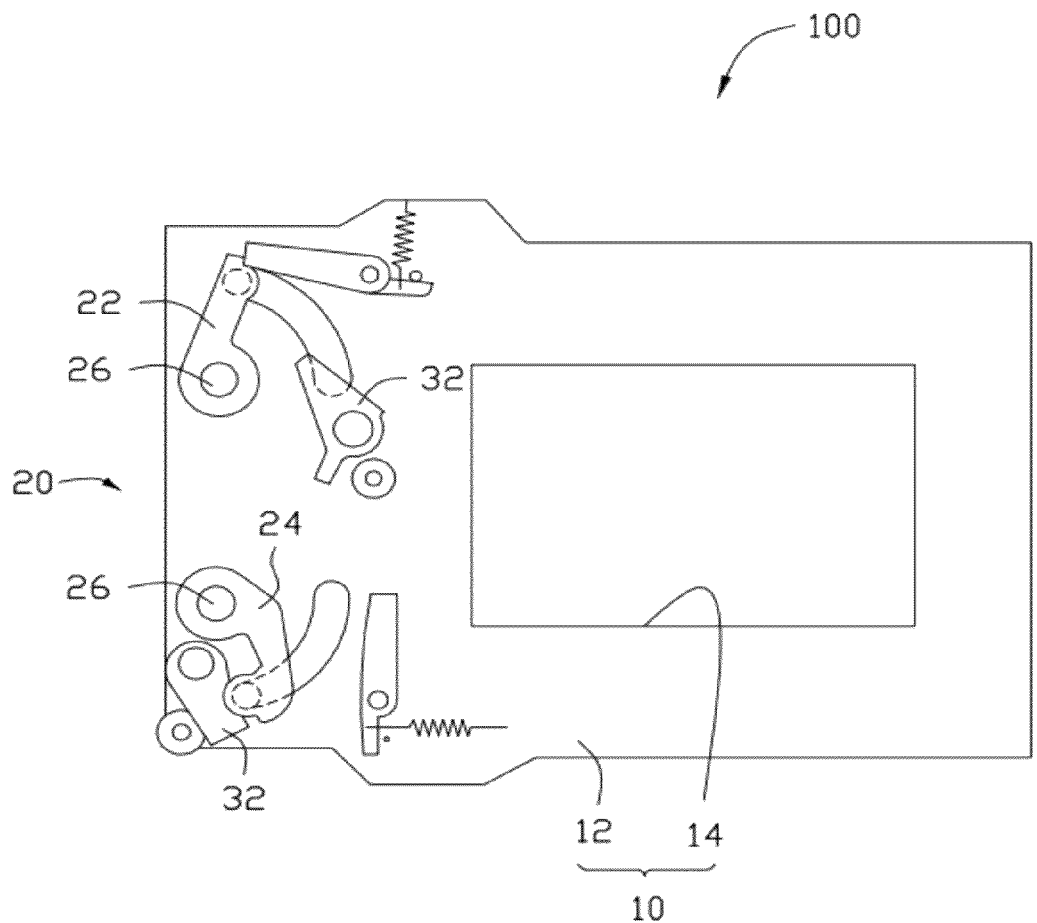
FIG. 8 is a top view of one embodiment of a camera shutter using the friction member shown in FIG. 6.
Figure 9:
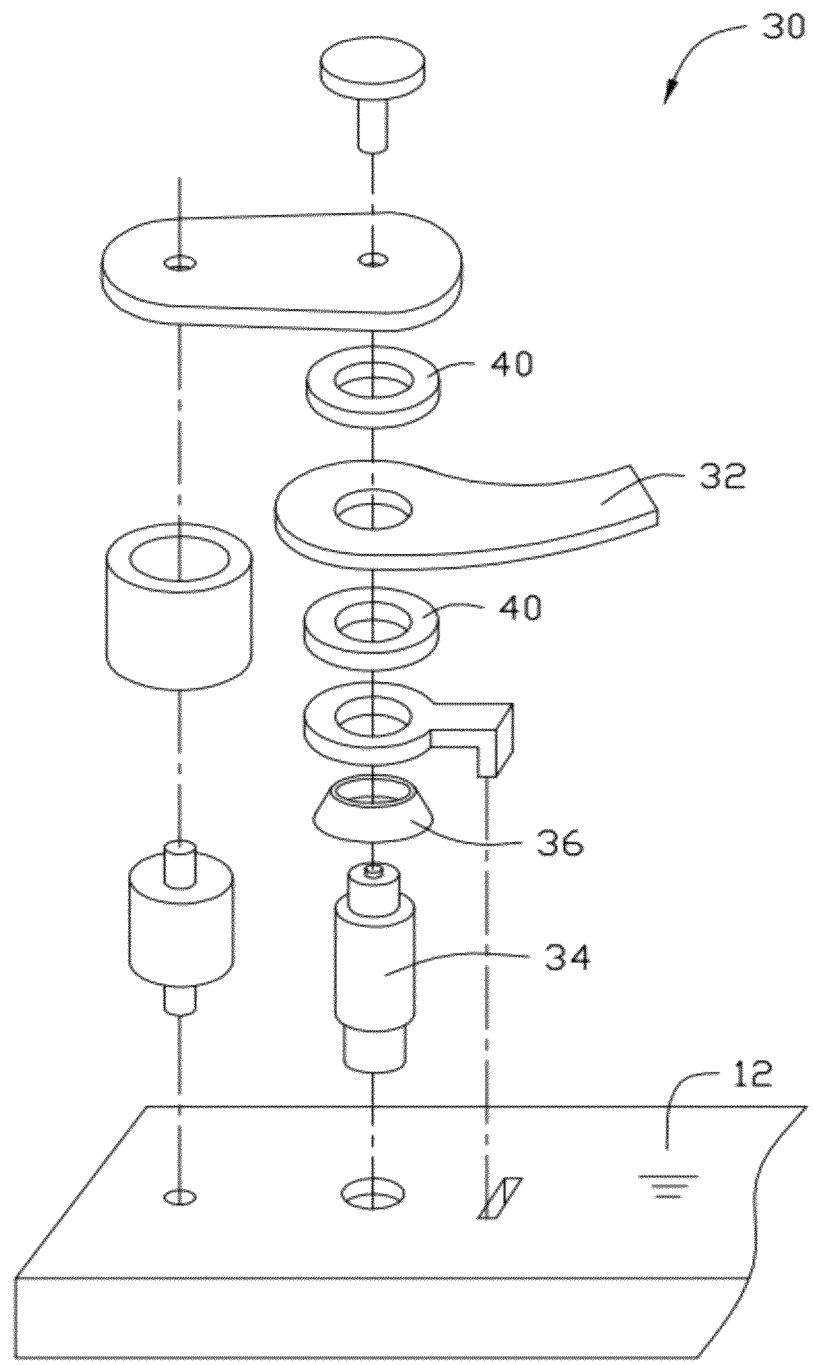
FIG. 9 is an exploded view of one embodiment of a brake mechanism for the camera shutter shown in FIG. 8.

Referring to FIG. 8 and FIG. 9, one embodiment of a camera shutter 100 using the washer 40 is provided. The camera shutter 100 includes a shutter substrate 10, a drive mechanism 20, two brake mechanisms 30, and a blade structure (not shown).

The shutter substrate 10 is configured to support the drive mechanism 20, the brake mechanism 30, and the blade structure. The shutter substrate 10 includes a body 12 and defines an aperture 14. When the camera shutter 100 is in use, an amount of light irradiates a photosensitive element through the aperture 14. When the camera shutter 100 is not in use, the blade structure covers the aperture 14 to prevent the light from irradiating the photosensitive element.

The drive mechanism 20 connects with the blade structure and drives the blade structure to open or close, thus, the aperture 14 can be opened or closed. The drive mechanism 20 includes two shafts 26, a front blade driving lever 22 and a back blade driving lever 24. The front and back blade driving levers 22, 24 are respectively connected with the shutter substrate 10 by the two shafts 26. The front and back blade driving levers 22, 24 are located on a same side of the shutter substrate 10. The front and back blade driving levers 22, 24 can be respectively rotated around the shafts 26 clockwise or anti-clockwise along two moving paths to drive the blade structure opening or closing, thereby opening or closing the aperture 14.

The two brake mechanisms 30 are respectively located at the clockwise terminations of the two moving paths to brake the drive mechanism 20. Each brake mechanism 30 includes a support shaft 34, two washers 40, a brake lever 32 between the two washers 40, and a Belleville spring 36. One of the washers 40, the brake lever 32, the other washer 40, and the Belleville spring 36 are harnessed on the support shaft 34 in sequence. The brake lever 32 is located at the clock wise terminations of the moving path of the front blade driving lever 22 or the back blade driving lever 24, to brake the front blade driving lever 22 or the back blade driving lever 24. The support shaft 34 supports the two washers 40, the brake lever 32 and the Belleville spring 36. The two washers 40 are urged against the brake lever 32 by the Belleville spring 36.

When the front blade driving lever 22 is rotated clockwise to reach the termination of the moving path, the front blade driving lever 22 blocks off the brake lever 32 and makes the brake lever 32 rotate around the support shaft 34. When the brake lever 32 is rotated, a frictional force is generated between the two washers 40 and the brake lever 32 by the urging force of the Belleville spring 36. The rotating energy of the front blade driving lever 22 is absorbed by the frictional force. Thus, the front blade driving lever 22 and the blade structure are further braked. The back blade driving lever 24 operates in the same manner as that of the front blade driving lever 22.

It can be understood that the friction member is not limited to the washer 40, it also can be other types which can provide a stable friction force for a brake lever in the brake mechanism in a camera shutter.

Figure 10:
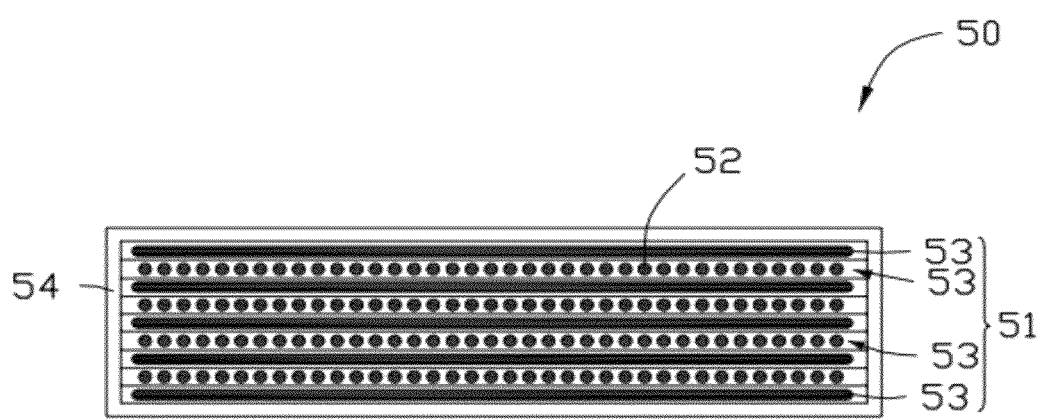
FIG. 10 is a cross-sectional view of one embodiment of a friction member for brake mechanism in a camera shutter.

Referring to FIG. 10, one embodiment of a friction member 50 for a brake mechanism in a camera shutter is provided. The friction member 50 is a ring sheet-shaped washer with a thickness of about 50 μm. The friction member 50 includes a carbon nanotube structure 51 including a plurality of stacking carbon nanotube layers 53 and an epoxy resin 54.

In one embodiment, the carbon nanotube layers 53 are about 25% by weight of the friction member 50. Each carbon nanotube layer 53 includes a plurality of twisted carbon nanotube wires 52. Each of the twisted carbon nanotube wires 52 includes a plurality of carbon nanotubes defining a plurality of micropores. In one embodiment, a plurality of interspaces is defined by the adjacent twisted carbon nanotube wires 52. The epoxy resin surrounds the surface of the carbon nanotube structure 51 and infiltrates the micropores. In one embodiment, the twisted carbon nanotube wires 52 are located side by side without spaces and are parallel to each other. The angles defined by the twisted carbon nanotube wires 52 in each adjacent two carbon nanotube layers are about 90 degrees. Therefore, the friction member 50 can avoid cracking along any directions, and has proper strength in directions parallel to the surface of the friction member 50.

A method for making the friction member 50 can include the following steps of:

providing the twisted carbon nanotube wires 52;

forming a first carbon nanotube layer and a second carbon nanotube layer; wherein forming the first carbon nanotube layer comprises arranging twisted carbon nanotube wires 52 side by side along a first direction, and forming the second carbon nanotube layer comprises placing twisted carbon nanotube wires 52 side by side along a second direction that is substantially perpendicular to the first direction;

layering a plurality of first carbon nanotube layers and second carbon nanotube layers alternatively to form the carbon nanotube structure 51;

applying a liquid epoxy resin to the carbon nanotube structure 51 to form a carbon nanotube epoxy resin composite; this may be done by dipping the carbon nanotube structure 51 into a liquid epoxy resin or coating the liquid epoxy resin on the carbon nanotube structure 51; and stamping the carbon nanotube epoxy resin composite to form the friction member 50.

Figure 11:
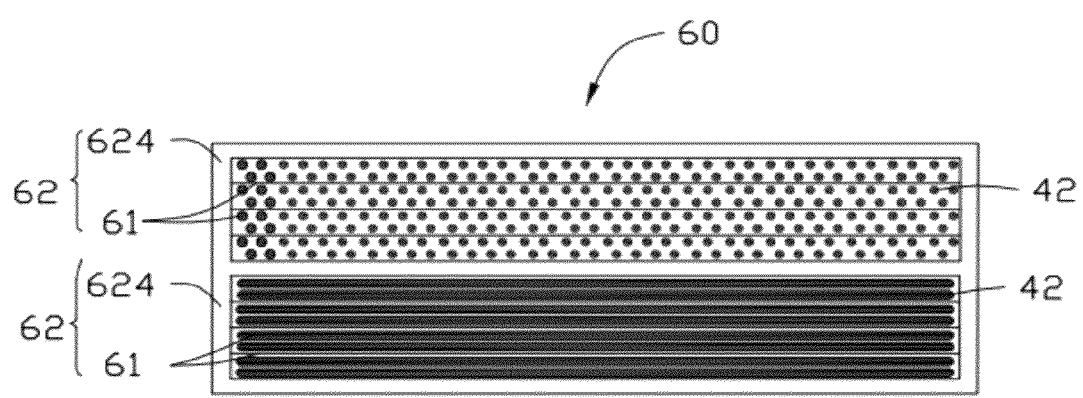
FIG. 11 is a cross-sectional view of one embodiment of a friction member for brake mechanism in a camera shutter.

Referring to FIG. 11, one embodiment of a friction member 60 for a brake mechanism in a camera shutter is provided. The friction member 60 includes at least two carbon nanotube composite layers 62 stacked on each other. Each carbon nanotube composite layer 62 includes the carbon nanotube structure 61 including a plurality of carbon nanotubes and a polymer 624. The carbon nanotube structure 61 can include the at least one carbon nanotube film or the at least one carbon nanotube wire. The carbon nanotube structure 61 is located in the polymer 624. That is to say, the polymer 624 is coated on surfaces of the carbon nanotube structure 61 and fills the micropores defined by the carbon nanotubes and/or the carbon nanotube wires.

In one embodiment, the carbon nanotube structure 61 includes at least two drawn carbon nanotube films, the carbon nanotubes in the carbon nanotube structure 61 are substantially oriented along a same direction, thus, the carbon nanotubes in each carbon nanotube composite layer are substantially oriented along a same direction; the carbon nanotubes in adjacent two carbon nanotube composite layers form an angle along the carbon nanotubes oriented directions. The angle can range from about 0 degrees to about 90 degrees. In one embodiment, the carbon nanotube structure 61 includes a plurality of carbon nanotube wires substantially parallel to each other, thus, the carbon nanotube wires in the carbon nanotube structure 61 substantially extend along a same direction. The carbon nanotube wires in two adjacent carbon nanotube composite layers form an angle along extending directions of the carbon nanotube wires. The angle can range from about 0 degrees to about 90 degrees.

In one embodiment, the friction member 60 includes two layers of sheet-shaped carbon nanotube composite layers 62. Each carbon nanotube composite layer 62 includes a plurality of drawn carbon nanotube films 42 substantially arranged along a same direction. Namely, the carbon nanotubes are substantially arranged along the same direction in the each carbon nanotube composite layer 62. The angle defined by the extending directions of the carbon nanotubes arranged in the two carbon nanotube composite layers 62 can be from about 0 degrees to about 90 degrees. In one embodiment, the angle is about 90 degrees. The polymer 624 is PET. The polymer 624 wraps around the surfaces of the drawn carbon nanotube films 42 and fills in the micropores defined by the carbon nanotubes in the drawn carbon nanotube films 42. The thickness of the friction member 60 is about 50 μm. The drawn carbon nanotube films 42 are about 30% by weight of the friction member 60.

A method for making the friction member 60 can include the steps of:

providing at least two carbon nanotube composite layers 62, wherein the at least two carbon nanotube composite layers 62 includes the drawn carbon nanotube films 42 and PET;

stacking at least two carbon nanotube composite layers 62 on each other, and angle defined by the extending directions of the carbon nanotubes arranged in adjacent two of the carbon nanotube composite layers 62 is about 90 degrees;

hot-pressing the stacked carbon nanotube composite layers 62; and stamping the hot pressed carbon nanotube composite layers 62 to form the friction member 60.

Each carbon nanotube composite layer 62 is made by stacking the drawn carbon nanotube films 42 one by one to form the carbon nanotube structure 61 including the carbon nanotubes substantially arranged along a same direction; and dipping the carbon nanotube structure 61 into a liquid PET, or coating the liquid PET onto the carbon nanotube structure.

It can be understood that the friction members 50, or 60 can be substituted for the friction member 40 to be used in the camera shutter 100.

According to the above descriptions, the friction members for the brake mechanisms in camera shutters and the camera shutter using the friction members of the present disclosure have the following advantages.

First, the friction members are made of the carbon nanotubes and the carbon nanotubes have good mechanical properties as mentioned above. Therefore, the friction members are wearable and durable. The speeds and durability of the camera shutter using the friction members can be improved.

Second, the carbon nanotubes in the friction members are intercrossed with each other, therefore, the friction member can avoid cracking along the aligned directions of the carbon nanotubes, and is very strong along any direction.

Third, the friction members are formed by a predetermined proportion of the carbon nanotubes and the polymer, and the carbon nanotubes and the polymer work well together to provide good desirable mechanical properties to the friction members, especially when the weight of the carbon nanotubes in the friction members is relatively low.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

Depending on the embodiment, certain steps or methods described may be removed, others may be added, and the sequence of steps may be altered. It is also to be understood that the description and the claims drawn relating to a method may include some indication in reference to certain steps. However, the indication used is only to be viewed for identification purposes and not taken as a suggestion as to an order for the steps.

What is claimed is:

1. A friction member for a brake mechanism in a camera shutter, comprising at least two carbon nanotube composite layers stacked on each other, each carbon nanotube composite layer comprising a polymer and a carbon nanotube structure, the carbon nanotube structure comprising a carbon nanotube film, and the carbon nanotube film comprises a plurality of carbon nanotubes substantially oriented along a same direction, wherein the carbon nanotube film is a free-standing structure, and an angle defined by the plurality of carbon nanotubes oriented along the same direction in adjacent carbon nanotube composite layers ranges from about 0 degrees to about 90 degrees.

2. The friction member of claim 1, wherein a weight percentage of the carbon nanotube structure ranges from about 5% to about 80% of the friction member.

3. The friction member of claim 1, wherein the carbon nanotube structure is a free standing structure comprising the plurality of carbon nanotubes joined together by van der Waals attraction force.

4. The friction member of claim 1, wherein the carbon nanotube structure is embedded in the polymer.

5. The friction member of claim 1, wherein the polymer is coated on surfaces of the carbon nanotube structure and present in a plurality of micropores defined by the plurality of carbon nanotubes.

6. The friction member of claim 1, wherein the plurality of carbon nanotubes are joined end-to-end by van der Waals attraction force along the same direction.

7. The friction member of claim 1, wherein a thickness of the friction member ranges from about 50 micrometers to about 500 micrometers.

8. The friction member of claim 1, wherein the carbon nanotube composite layer comprises a pure carbon nanotube structure and a poly(ethylene terephthalate) coated on surface of the pure carbon nanotube structure.

9. The friction member of claim 8, wherein the pure carbon nanotube structure consists of a plurality of drawn carbon nanotube film directly stacked with each other.

10. A friction member for a brake mechanism in a camera shutter, comprising at least two carbon nanotube composite layers stacked on each other, each carbon nanotube composite layer comprising a polymer and a carbon nanotube structure, the carbon nanotube structure comprising a plurality of carbon nanotube wires substantially parallel to each other, wherein each carbon nanotube wire comprises a plurality of carbon nanotubes helically oriented around an axial direction of the each carbon nanotube wire, and an angle defined by the plurality of carbon nanotube wires in adjacent carbon nanotube composite layers ranges from about 0 degrees to about 90 degrees.

11. The friction member of claim 10, wherein each carbon nanotube wire comprises a plurality of carbon nanotubes substantially oriented along a same direction.

12. The friction member of claim 11, wherein most of the plurality carbon nanotubes are joined end-to-end by van der Waals attraction force along the same direction.

13. The friction member of claim 10, wherein the carbon nanotube structure comprises at least one carbon nanotube layer, each carbon nanotube layer comprises a plurality of parallel carbon nanotube wires juxtaposed with each other side by side.

14. A camera shutter, comprising:
a drive mechanism comprising a blade driving lever having a moving path; and
a brake mechanism comprising two friction members and a brake lever clamped between the two friction members, the brake lever being located at a termination of the moving path;
wherein each of the two friction members comprises at least two carbon nanotube composite layers stacked on each other, each carbon nanotube composite layer comprises a polymer and a carbon nanotube structure, the carbon nanotube structure comprises a plurality of carbon nanotube films stacked on each other, and adjacent carbon nanotube films are in contact with each other and combined by van der Waals attraction force, and the carbon nanotube structure comprises a plurality of carbon nanotubes substantially oriented along a same direction, an angle defined by the plurality of carbon nanotubes oriented along the same direction in adjacent carbon nanotube composite layers ranges from about 0 degrees to about 90 degrees.

15. The camera shutter of claim 14, wherein the carbon nanotube structure is embedded in the polymer.

16. The camera shutter of claim 14, wherein the polymer is coated on the carbon nanotube structure and located in a plurality of micropores defined by the plurality of carbon nanotubes.

17. The camera shutter of claim 14, wherein the carbon nanotube structure comprises a plurality of drawn carbon nanotube films stacked on each other, and adjacent drawn carbon nanotube films are combined by van der Waals attraction force.

18. The camera shutter of claim 14, wherein most of the plurality of carbon nanotubes are joined end-to-end by van der Waals attraction force along the same direction.

19. The camera shutter of claim 14, wherein a weight percentage of the carbon nanotube structure ranges from about 5% to about 80% of each of the two friction members.

20. The friction member of claim 14, wherein a thickness of each of the two friction members ranges from about 50 micrometers to about 500 micrometers.

* * * * *